US007717375B2

(12) United States Patent
Chen

(10) Patent No.: US 7,717,375 B2
(45) Date of Patent: May 18, 2010

(54) ROTATION CONTROL DEVICE FOR SUPPORT ARM OF A LAMP

(75) Inventor: Meiric Chen, Taipei Hsien (TW)

(73) Assignee: Seed Lighting Design Co., Ltd, Hsin Chuang, Taipei Hsien ( * ) Notice: Subject to any disclaimer, the term of this patent is extended or adjusted under 35 U.S.C. 154(b) by 58 days.

(21) Appl. No.: 12/050,954

(22) Filed: Mar. 19, 2008

(65) Prior Publication Data

US 2009/0236481 A1 Sep. 24, 2009

(51) Int. Cl.
*F16M 11/00* (2006.01)

(52) U.S. Cl. ................................ 248/125.7; 248/282.1

(58) Field of Classification Search .............. 248/125.7, 248/121, 122.1, 176.1, 284.1, 291.1, 292.14, 248/282.1, 289.11; 362/285, 287, 414, 427–429, 362/431
See application file for complete search history.

(56) References Cited

U.S. PATENT DOCUMENTS 1,266,367 A * 5/1918 Wilson .......................... 5/646
5,236,160 A * 8/1993 Sechelski ................. 248/125.1
6,457,686 B1 * 10/2002 Hill ......................... 248/176.1
7,290,744 B2 * 11/2007 Baldasari ................. 248/218.4
7,367,690 B2 * 5/2008 Chen .......................... 362/285
7,438,269 B2 * 10/2008 Pfister et al. ........... 248/292.14
2004/0245420 A1 * 12/2004 Pfister et al. ........... 248/289.11
2008/0016712 A1 * 1/2008 Van ............................ 34/283

* cited by examiner

*Primary Examiner*—Ramon O Ramirez

(57) ABSTRACT

A rotation control device for a support arm of a lamp comprises a support arm having a first end and a second end; a rotating arm having a first end and a second end; a lamp head assembled to the second end of the rotating arm; a cambered track fixed to a predetermined position of the support arm; and a cambered slot being formed in the cambered track; a stop sheet installed to a predetermined position of the cambered track; the stop sheet being movable along the cambered slot of the cambered track and is fixable at a predetermined position so that the rotating arm is retained to a predetermined angle.

6 Claims, 7 Drawing Sheets

ROTATION CONTROL DEVICE FOR SUPPORT ARM OF A LAMP

FIELD OF THE INVENTION

The present invention relates to lamps, in particular to a rotation control device for a support arm of a lamp, wherein the support arm is adjusted to a desired angle for providing a desired illumination, while the support arm can be retained firmly.

BACKGROUND OF THE INVENTION

Generally, an angle adjustable lamp has a support arm and a rotating arm. The support arm is assembled to a seat which can be seated upon a table surfaces or a platform so as to form as a stand lamp. The support arm can be directly to a wall to form as a suspending lamp. The support arm may be assembled with a lamp head which has a lamp and a lampshade. Moreover, the support arm is pivoted to the rotating arm so that the rotating arm is rotatable with respect to the support arm so as to control the angle of the lamp head. It should be noted that for retaining the rotating arm to a predetermined angle, as illustrated in FIG. 7, a prior art lamp has a rubber pad 3 installed between the support arm 1 and the rotating arm 2. A stud 4 serves to lock it so that the rubber pad 3 has the effect of slide stop to prevent that after adjustment of the angle, the rotating arm 2 will loose.

However although the rubber pad 2 has the effect of slide stop, but since the structural design will cause another end of the rotating arm 2 will suffer from a gravitation force so as to convert into a twisting torque to be applied to rubber pad 3 so that the pad 3 must suffer from the twisting torque. The rubber pad 3 is made of rubber. The rubber is easy to weaken as it is used for a longer time and thus deforms. Therefore, after the rubber pad 3 is used for a long time, the slide stop effect is reduced. The lamp cannot be steadily supported and fixed so as to shift and swing. As a result, the lamp cannot be steadily retained to an original position with a desired illumination.

SUMMARY OF THE INVENTION

Accordingly, the object of the present invention is to provide a rotation control device for a support arm of a lamp, wherein the support arm is adjusted to a desired angle for providing a desired illumination, while the support arm can be retained firmly.

To achieve above object, the present invention provides a rotation control device for a support arm of a lamp, comprising; a support arm having a first end and a second end; a rotating arm having a first end and a second end; a lamp head assembled to the second end of the rotating arm; a cambered track fixed to a predetermined position of the support arm; and a cambered slot being formed in the cambered track; a stop sheet installed to a predetermined position of the cambered track; the stop sheet being movable along the cambered slot of the cambered track and is fixable at a predetermined position so that the rotating arm is retained to a predetermined angle.

A threaded rotating button screwed to the rotating arm for tightening the rotating arm to a respective portion of the cambered track.

The stop sheet has a pressing surface and the cambered track has a pressed surfaces; and the pressing surface is capable of pressing the pressed surface.

The stop sheet is a pullable rod capable of tightening the rotating arm and capable of buckling to a respective portion of the cambered track.

The second end of the support arm and the first end of the rotating arm is pivotally connected so as to be as a rotation fulcrum; a compressible spring is connected therebetween so as to provide a predetermined rotating pressure to the fulcrum.

The cambered track and support arm are retained through two points.

A threaded stud and a shaft stud is used to retain the cambered track to the support arm at the two points.

A first end of the support arm has a base.

A first end of the support arm is directly fixed to a position wall.

A pivot head is assembled to a lamp head which is pivoted to the second end of the rotating arm so as to form as a rotation fulcrum.

The rotation control device for a support arm of a lamp of the present invention uses a cambered track installed to the support arm with the stop sheet in the cambered track so as to form as a lever fulcrum. Thus a steady and firm support structure is provided to the support arm so that the support arm can be retained to a predetermined angle as a gravitation force is applied thereto for a longer time. Thus the lamp can provide a proper illumination. In the prior art, the rotating arm will loose as it is used for a time period. Next, the present invention has a simple structure and the cost in assembly is low. In operation, it is only necessary to tighten or release the stop sheet, the rotating arm can be adjusted to a predetermined angle rapidly. Thereby, the operation of the present invention is easy and conveniently and is a personal design.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
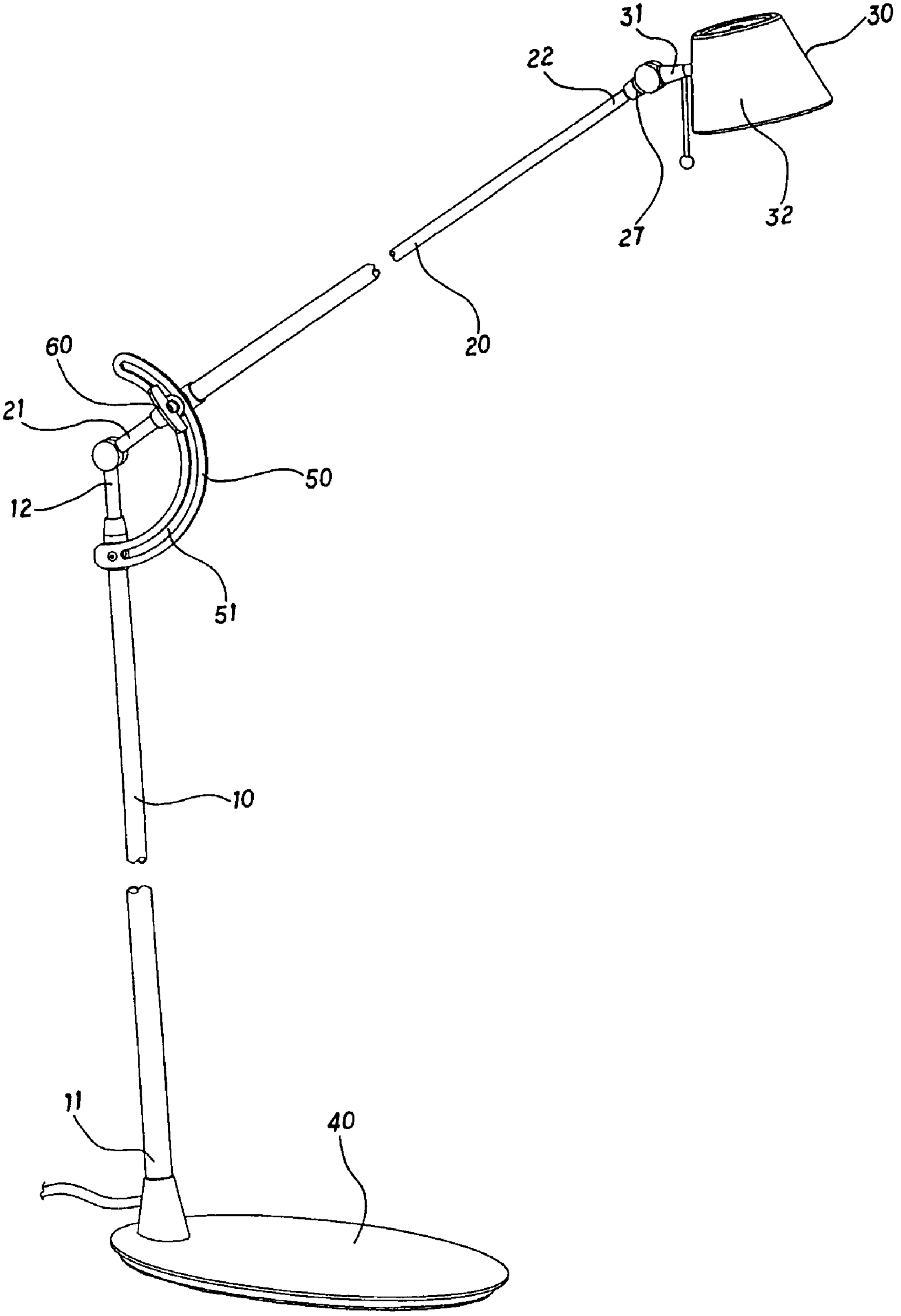
FIG. 1 is an assembled perspective view of the present invention.
Figure 2:
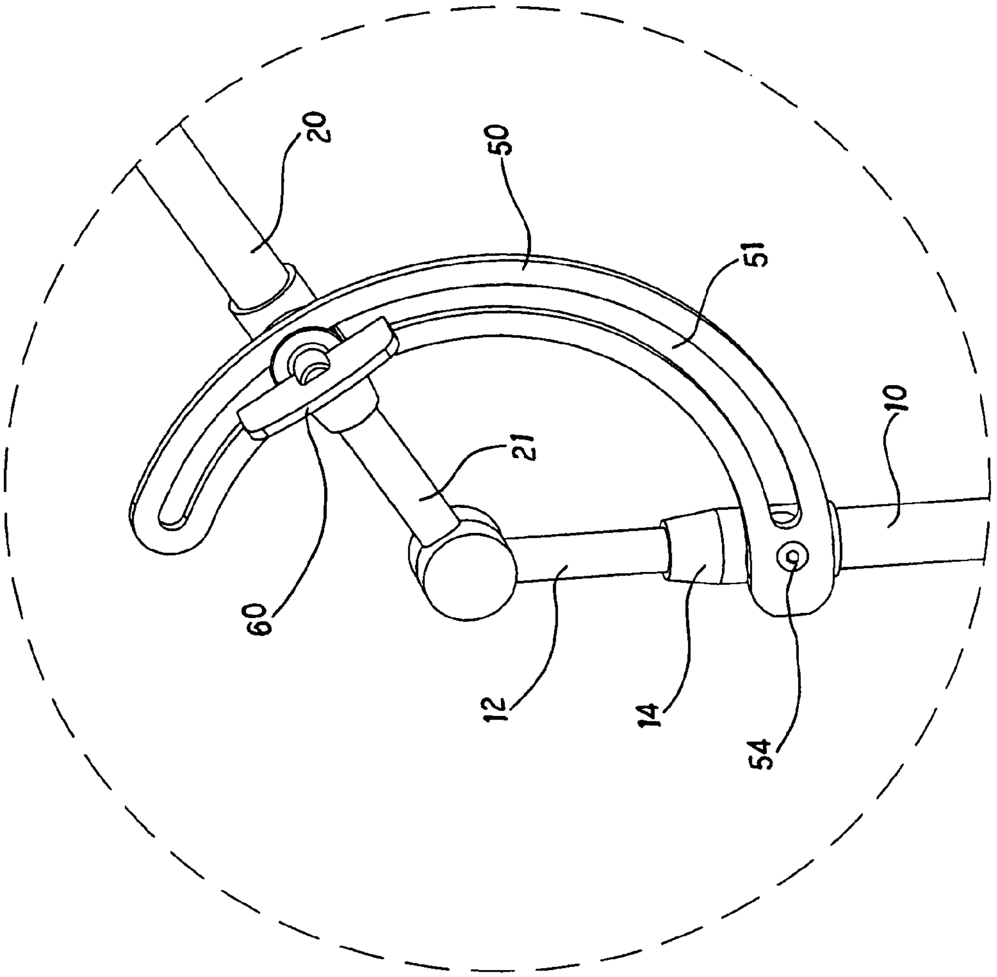
FIG. 2 is a partial enlarged view about the cambered track and the stop sheet of the cambered track in the present invention.
Figure 3:
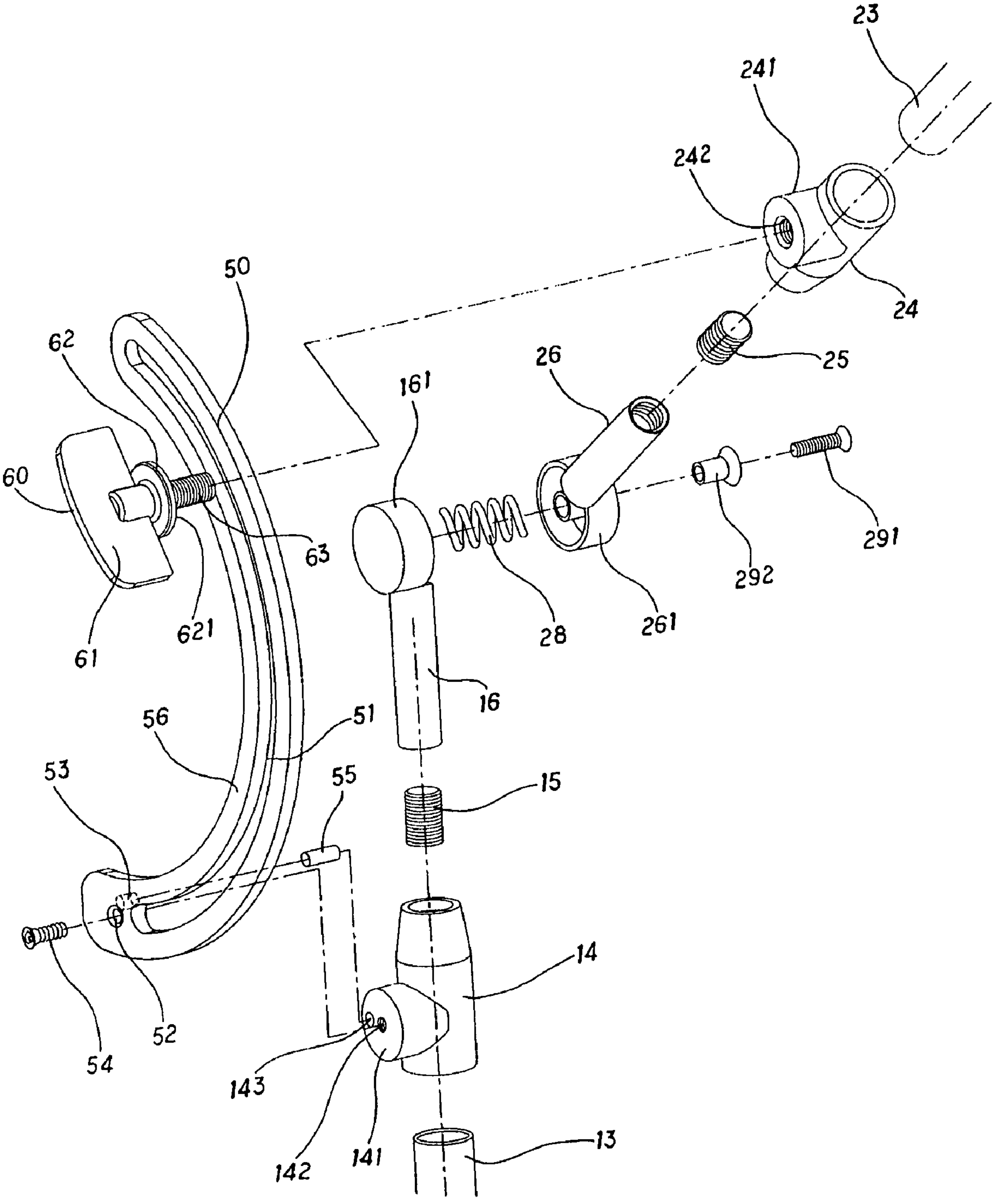
FIG. 3 is an exploded perspective view showing that the lamp is near the stop sheet of the cambered track according to the present invention.

With reference to FIGS. 1, 2 and 3, the rotation control device for a support arm of a lamp according to the present invention is illustrated. The device includes a support arm 10, a rotating arm 20, a lamp head 30, a base 40, a cambered track 50, and a stop sheet.

The support arm 10 has a first end 11 and a second end 12. In the present invention, the support arm 10 is formed by a tube body 13, a headless stud 15, and a pivot head 16. One free end of the tube body 13 is formed as the first end 11. One free end of the pivot head 16 is formed with the second end 12. The free end of the pivot head 16 is formed with a pivot portion 161. An outer surface of the tube joint 14 is extended with a protrusion 141. The protrusion 141 is installed with a threaded hole 142 and a stud hole 143.

The rotating arm 20 has a first end 21 and a second end 22. The rotating arm 20 includes a tube body 23. A tube body 23 of the rotating arm 20 is sequentially arranged with a tube joint 24, a headless stud 25 and a pivot head 26 corresponding to the support arm 10. One end of the rotating arm 20 is arranged with a pivot head 27. A free end of the pivot head 26 and a free end of the pivot head 27 are formed with the first end 21 and the second end 22, respectively. The free end of the pivot head 26 is formed with a pivot portion 261. A compression spring 28 is installed between the pivot portion 161 of the support arm 10 and the pivot portion 261 of the pivot head 26. The two pivot portions are retained by threaded stud 291 and the shaft stud 292 so as to form as a fulcrum. The spring 29 provides a twisting force to resist against the gravitational force applied to the rotating arm 20 as the transient as the rotating arm 20 releases so as not to fall down as the rotating arm 20 rotates too fast. An outer periphery of the tube joint 24 extends with a protrusion 241. The protrusion 241 is installed with a threaded hole 242.

The lamp head 30 has a pivot head 31, a lampshade 32 fixed to one end of the pivot head 31 and a lamp body (not shown). The lamp body is at an interior of the lampshade for illumination. Another end of the pivot head 31 is pivoted to the pivot head 27 at the second end 22 of the rotating arm 20 as a rotation fulcrum. A compression spring (not shown) is installed between the pivot head 31 and the pivot head 27 for providing a predetermined pressure in rotation.

The base 40 is assembled to the first end 11 of the support arm 10. A weight (not shown) is installed in the base 40 for stabilizing the support arm 10 so that the lamp can be positioned on a table or platform.

The cambered track 50 is fixed to a predetermined position of the support arm 10 and is formed with a cambered slot 51. In this embodiment, the cambered track 50 has shape like a crescent moon. One end of the cambered track 50 has a through hole 52 and a stud hole 53 corresponding to the threaded hole 142 and stud hole 143 in the tube joint 14 of the support arm 10. A thread stud 53 and a shaft stud 55 pass through the threaded hole 142 and stud hole 143 to retain the cambered track 50 to the support arm 10 with two fixing points. Moreover, one side of the cambered track 50 is formed with a pressed surface 56 at one side of the cambered slot 51.

Figure 5:
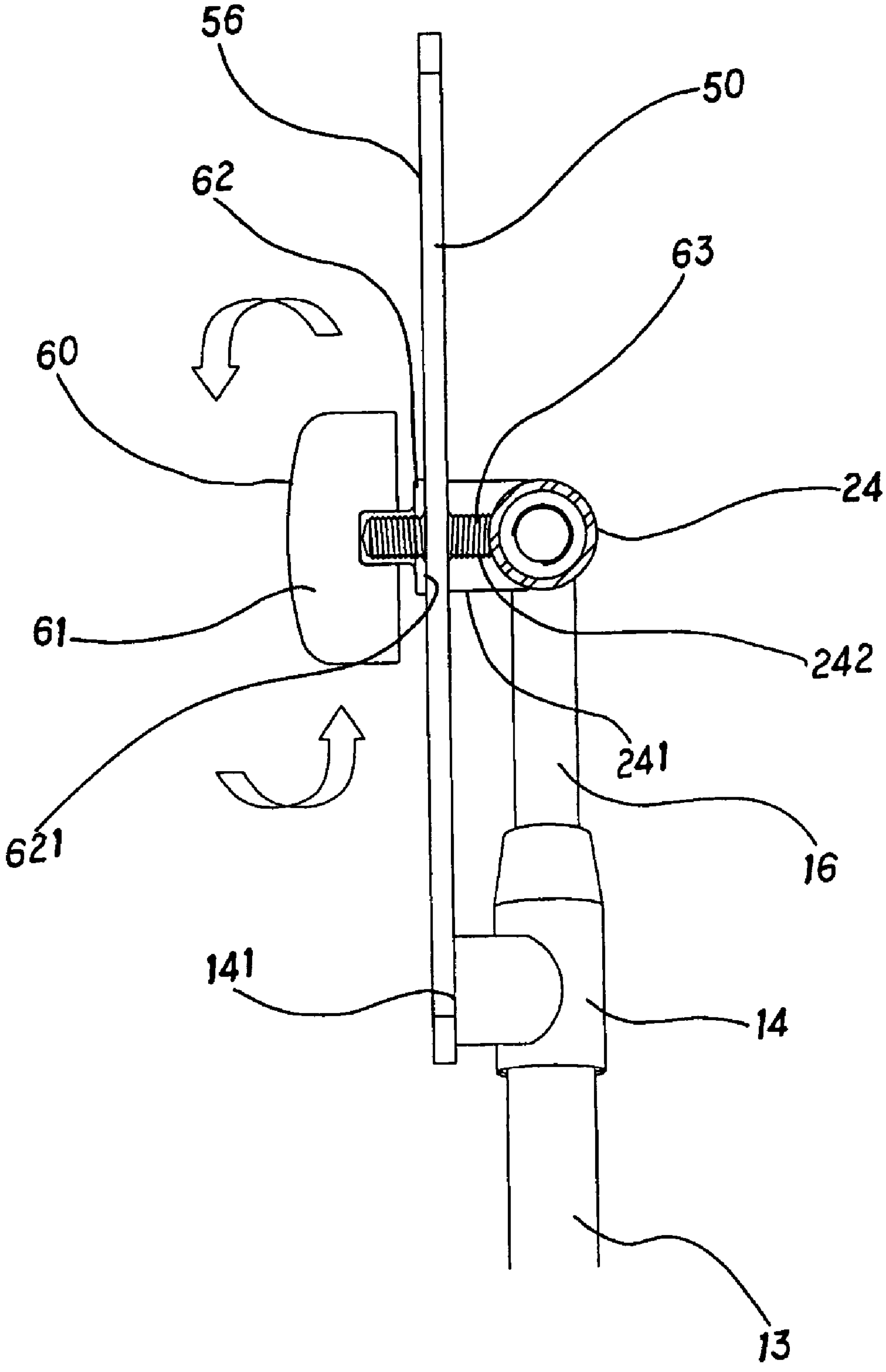
FIG. 5 is a partial lateral cross sectional view showing the relation of the stop sheet and the cambered track according to the present invention.

A stop sheet 60 is assembled to a predetermined position of the rotating arm 20 to guide the rotating arm 20 to move along the cambered track 50 so that the rotating arm 20 can be controlled to retain at a predetermined angle. The stop sheet 60 of this embodiment may be a rotating button. The stop sheet 60 has a handle 61, a press plate 62 connected to the handle 61, and a stud portion 63 connected to the press plate 62, as illustrated in FIG. 5. Moreover, the press plate 62 is formed with a pressing surface 621. When the stud portion 63 passes through the cambered slot 51 of the cambered track 50 and is screwed to the threaded hole 242 of the tube joint 24, they form a cambered guide structure and the rotating arm 20 is guided along the cambered track 50 to be at a predetermined angle. When the button is tightened, the pressing surface 621 of the press plate 62 will press the pressed surface 56 of the cambered track 50 so as to control the rotating arm 20 at the angle. Other than the stop sheet 60 having a form of a button, in the present invention, the stop sheet 60 may be an elastic pullable rod (not shown). Normally, the elastic pullable rod is buckled to a respective portion of the cambered track 50 by the elasticity of an elastic element. When the rod is pulled outwards, it is released from the portion of the cambered track 50 so that the rotating arm 20 is rotatable.

Next, in the rotation control device of the lamp of the present invention, other than being assembled to the base 40 as a seated lamp, the support arm 10 can be assembled to a wall so as to form as a suspending lamp.

Figure 4:
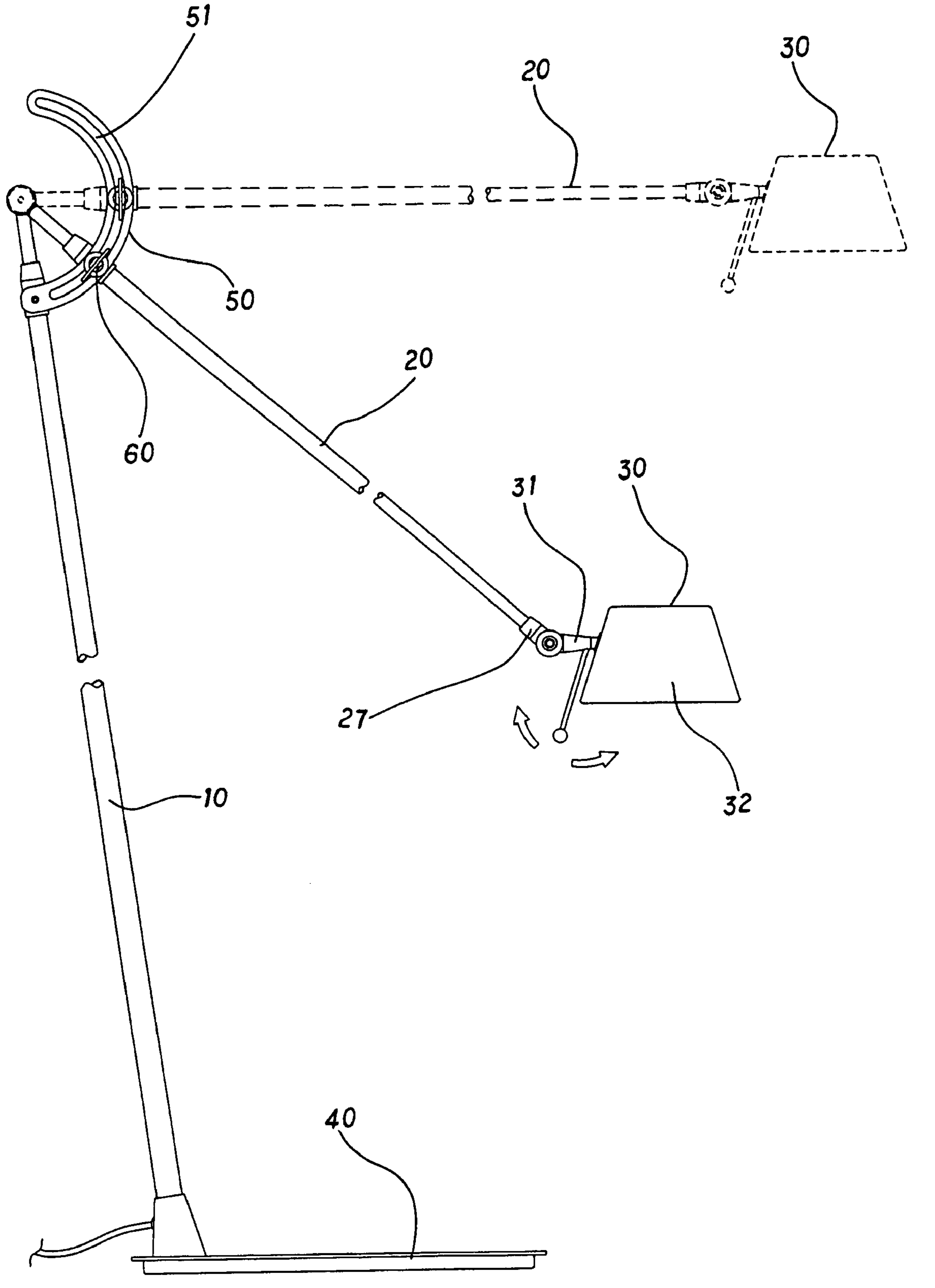
FIG. 4 is a schematic view showing the angle adjustment of the rotating arm and the lamp head according to the present invention.
Figure 6:
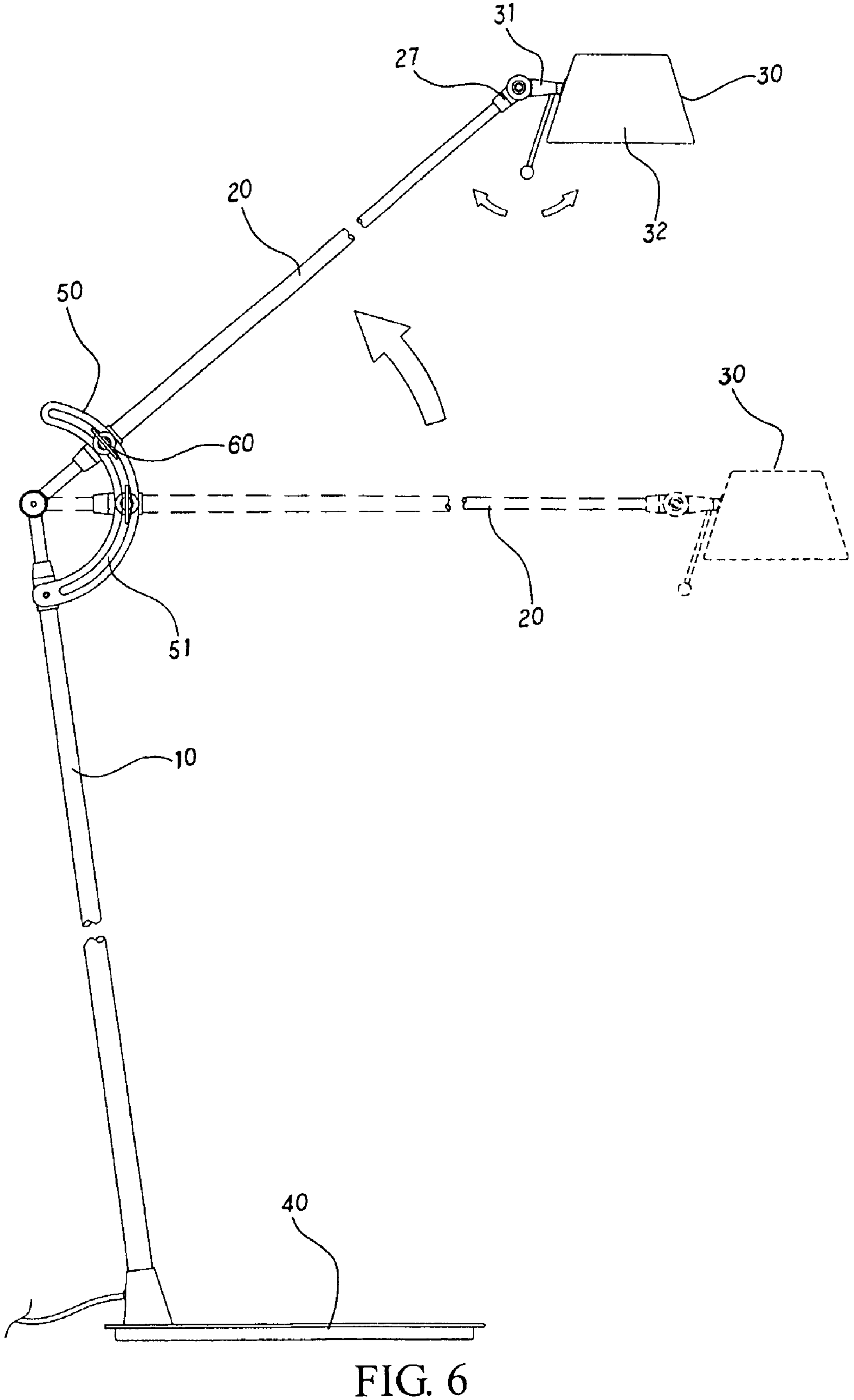
FIG. 6 is a schematic view showing the operation of adjusting the angle of the rotating arm and the lamp head.
Figure 7:
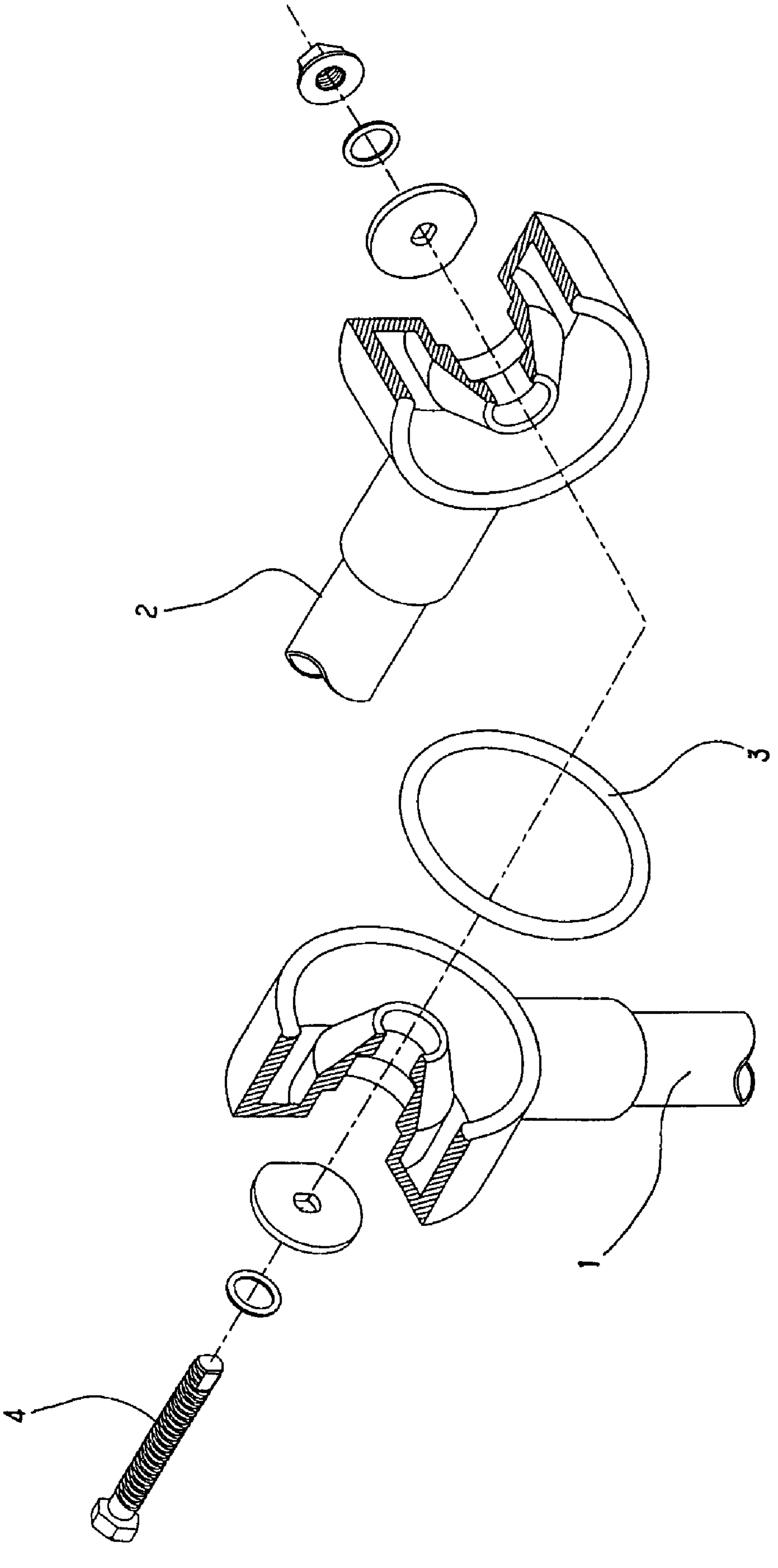
FIG. 7 PRIOR ART
FIG. 7 is a schematic view showing the pivot connection of a prior art lamp.

Referring to FIGS. 1 and 2, in the present invention, the rotation control device for a support arm of a lamp has the function of easily adjusting the swinging of the rotating arm 20. In operation, it is only necessary to release the stop sheet 60, as illustrated in FIG. 5, so that the stop sheet 60 and the cambered track 50 can in a loose state. Then as illustrated in FIGS. 4 and 6, the rotating arm 20 is rotated to a predetermined angle. Then the stop sheet 60 is tightened, as illustrated in FIG. 5 so that the pressing surface 621 of the press sheet 62 tightly presses the pressed surface 56 of the cambered track 50. Then the rotating arm 20 is fixed to the cambered track 50 to complete the adjusting operation. The orientation of the lamp head 30 is adjustable by the pivoting structure between the pivot head 31 of the lamp head 30 and the pivot head 27 of the rotating arm 20.

It should be noted that the rotation control device for a support arm of a lamp of the present invention uses a cambered track 50 installed to the support arm 10 with the stop sheet 60 in the cambered track 50 so as to form as a lever fulcrum. Thus a steady and firm support structure is provided to the support arm 10 so that the support arm 10 can be retained to a predetermined angle as a gravitation force is applied thereto for a longer time. Thus the lamp can provide a proper illumination. In the prior art, the rotating arm 20 will loose as it is used for a time period. Next, the present invention has a simple structure and the cost in assembly is low. In operation, it is only necessary to tighten or release the stop sheet 60, the rotating arm 20 can be adjusted to a predetermined angle rapidly. Thereby, the operation of the present invention is easy and conveniently and is a personal design.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What claimed is:

1. A rotation control device for a support arm of a lamp, comprising;

a support arm having a first end; a second end and a tube joint (24) between the first end and the second end; the tube joint (24) having a protrusion (241) which is formed with a threaded hole (242);

a rotating arm having a first end and a second end;

a lamp head assembled to the second end of the rotating arm;

a cambered track fixed to a predetermined position of the support arm; and a cambered slot being formed in the cambered track;

a stop sheet; and wherein the stop sheet is a threaded rotating button which is screwed to the threaded hole (242) of the protrusion (241) of the rotating arm (20); and the protrusion of the rotation arm passes through the cambered slot of the cambered track so that the stop sheet (60) is movable along the cambered slot; and wherein the stop sheet (60) has a handle (61), a press plate (62) connected to the handle (61), and a stud portion (63) connected to the press plate (62), the press plate is formed with a pressing surface; when the stud portion (63) passes through the cambered slot (51) of the cambered track (50) and is screwed to the threaded hole (242) of the protrusion (241) of the tube joint (24), they form a cambered guide structure; when the pressing surface of the press plate (62) presses upon the cambered track (5), the rotating arm (20) is guided along the cambered track (50) to be at a predetermined angle.

2. The rotation control device for a support arm of a lamp as claimed in claim 1, wherein the second end of the support arm and the first end of the rotating arm are pivotally connected to be as a rotation fulcrum; and a compressible spring is connected therebetween to provide a predetermined rotating pressure to the fulcrum.

3. The rotation control device for a support arm of a lamp as claimed in claim 1, wherein the cambered track and support arm are retained through two points.

4. The rotation control device for a support arm of a lamp as claimed in claim 3, wherein a threaded stud and a shaft stud are used to retain the cambered track to the support arm at the two points.

5. The rotation control device for a support arm of a lamp as claimed in claim 1, wherein a first end of the support arm has a base.

6. The rotation control device for a support arm of a lamp as claimed in claim 1, wherein a pivot head is assembled to a lamp head which is pivoted to the second end of the rotating arm to form as a rotation fulcrum.

* * * * *